INVENTOR.
IRVING GLASSMAN

BY

ATTORNEY

INVENTOR.
IRVING GLASSMAN
BY Charles S. Hall
ATTORNEY

INVENTOR.
IRVING GLASSMAN
BY Charles S. Hall
ATTORNEY

NONLINEAR ANALOG TO DIGITAL CONVERTER

Filed Aug. 31, 1964

INVENTOR.
IRVING GLASSMAN
BY
Charles S. Hall
ATTORNEY

Oct. 24, 1967 I. GLASSMAN 3,349,390

NONLINEAR ANALOG TO DIGITAL CONVERTER

Filed Aug. 31, 1964

6 Sheets-Sheet 5

INVENTOR
IRVING GLASSMAN

BY

ATTORNEY

INVENTOR.
IRVING GLASSMAN
BY
Charles S. Hall
ATTORNEY

United States Patent Office 3,349,390
Patented Oct. 24, 1967

3,349,390
NONLINEAR ANALOG TO DIGITAL CONVERTER
Irving Glassman, Philadelphia, Pa., assignor to Burroughs Corporation, Detroit, Mich., a corporation of Michigan
Filed Aug. 31, 1964, Ser. No. 393,054
13 Claims. (Cl. 340—347)

This invention relates to a nonlinear analog to pulse-group converter. More particularly, this invention relates to a system for converting the voltage output of a nonlinear transducer into a pulse group which represents a number that is substantially proportional to the physical quantity sensed by the transducer.

In its simplest form, a voltage to pulse-count converter comprises an amplitude to elapsed-time converter and an elapsed-time to pulse-count converter, as shown in FIG. 1. In such a system, a voltage to be digitized goes through two conversions. First, it is converted into some manifestation of time, such as a pulse of a given duration, or two pulses separated by a given amount of time, in both cases the time being proportional to the analog voltage. The timed pulse or pulses are then used to control a device which emits a series of equally time-spaced pulses. It may be seen that the output of this pulse-duration to pulse-count converter will be a series of pulses whose number is a linear function of the voltage to be converted. Expressed algebraically.

$$\frac{\Delta P}{\Delta X}=\frac{\Delta V}{\Delta X}\times\frac{\Delta t}{\Delta V}\times\frac{\Delta P}{\Delta t} \qquad \text{Eq. (1)}$$

where:

$\Delta P/\Delta X$ is the increment in the pulse count for a given increment in the physical quantity being monitored.

$\Delta V/\Delta X$ is the increment in the voltage output of the transducer for a given increment in the physical quantity being monitored.

$\Delta t/\Delta V$ is the increment in the elapsed time between pulses generated by the voltage to elapsed-time converter for a given increment in the voltage received by it.

$\Delta P/\Delta t$ is the increment in the pulse count produced by the elapsed-time to pulse-count converter for a given increment in the time during which it is caused to operate.

The device just described is useful for giving a pulse-count conversion of a physical quantity monitored by a linear transducer, in which event the number of pulses produced will be directly proportional to the physical quantity. Many transducers, however, have monlinear voltage response characteristics. If the rest of the system is linear, the pulse count produced will not be proportional to the physical quantity being monitored. This may be readily seen on inspection of Equation 1.

In order that $\Delta P/\Delta X$ be linear, the product of the three fractions must be a constant over the range covered by the transducer. It may also be seen that such a non-linearity may be eliminated, and the product of the three fractions may be kept a constant by varying either $\Delta t/\Delta V$ or $\Delta P/\Delta t$.

It is therefore an object of this invention to provide a device for producing a pulse group substantially proportional in number to a physical quantity monitored by a nonlinear transducer.

It is another object of this invention to provide an analog to digital converter with a built-in nonlinearity proportioned to compensate for the nonlinearity of a transducer.

It is a further object of this invention to provide a voltage to pulse-count converter having a pulse generator programmed to generate pulses at different rates in succession.

Still another object of this invention is to provide a device which converts the voltage output of a nonlinear transducer into a pulse group substantially proportional in number to the quantity actuating said transducer.

These and other objects of the invention are achieved bya nonlinear voltage to pulse-count converter incorporating a linear voltage to time converter, which generates, in response to a start pulse, a delayed stop pulse time-spaced after the start pulse in proportion to the voltage to be converted. The start and stop pulses, respectively, open and close a gate connected between the output of a variable frequency pulse generator and the input of a binary counter. The binary coded outputs of the counter are connected to a pulse-count detector which produces a control pulse upon sensing any of several predetermined states of the counter's outputs. Each control pulse causes a change in the pulse repetition frequency of the pulse generator's output. The pulse counts in the counter at which a change is effected in the pulse frequency as well as the magnitude of those changes are parameters selected to give any desired response characteristic to the voltage to pulse-count converter. Where it is desired to produce a pulse count in response to the voltage output of a nonlinear transducer such that the pulse count is a substantially linear function of the physical quantity sensed by the transducer, these parameters are selected to make the response characteristic of the voltage to pulse-count converter substantially the inverse of the response characteristic of the transducer.

While some of the objects and a brief description of the invention have been given above, the invention and its objects will be best understood by referring to the following detailed description and to the accompanying drawings wherein.

Figure 4:
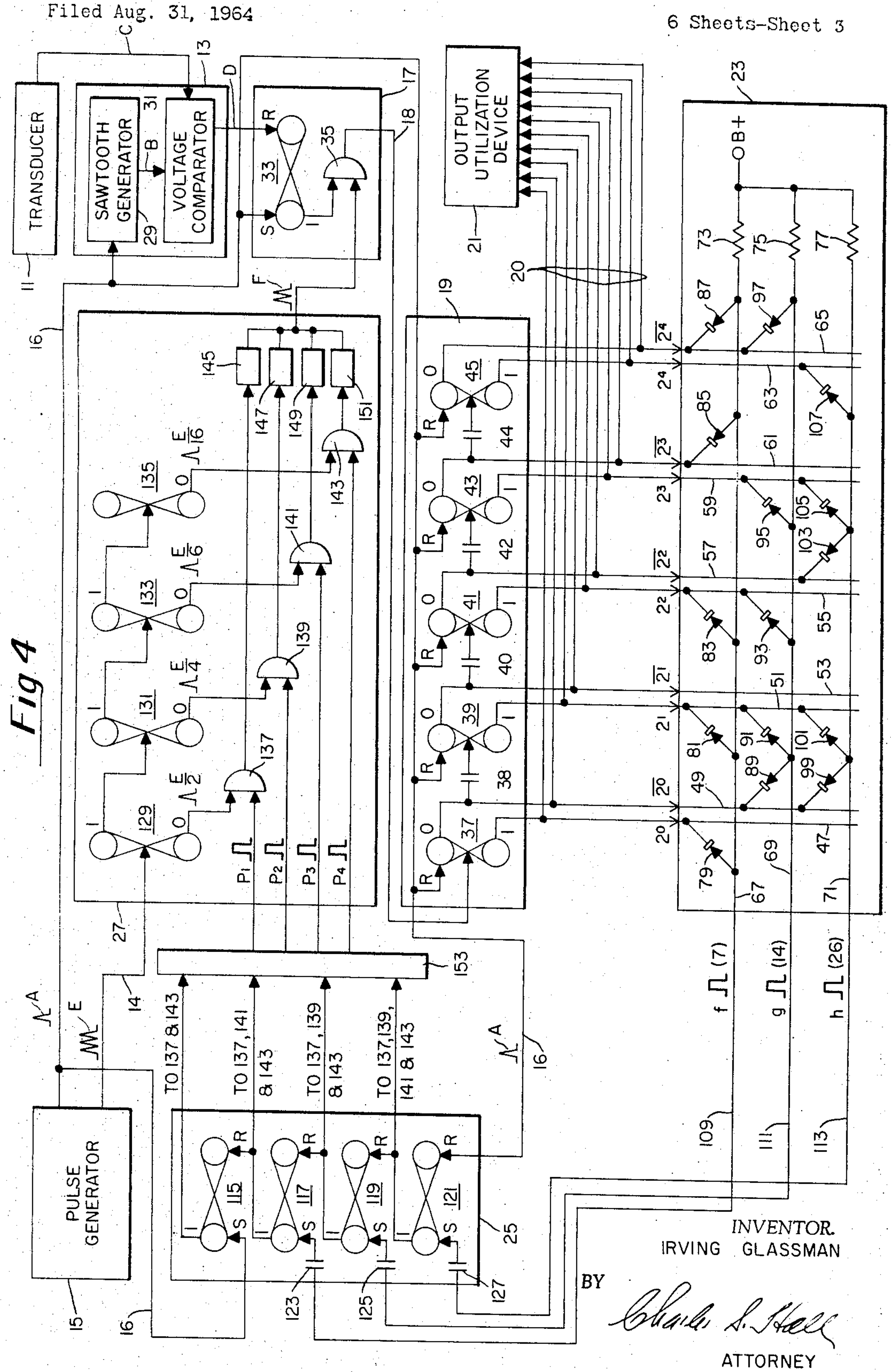
FIG. 4 is a schematic diagram of a system incorporating the present invention.
Figure 6A:
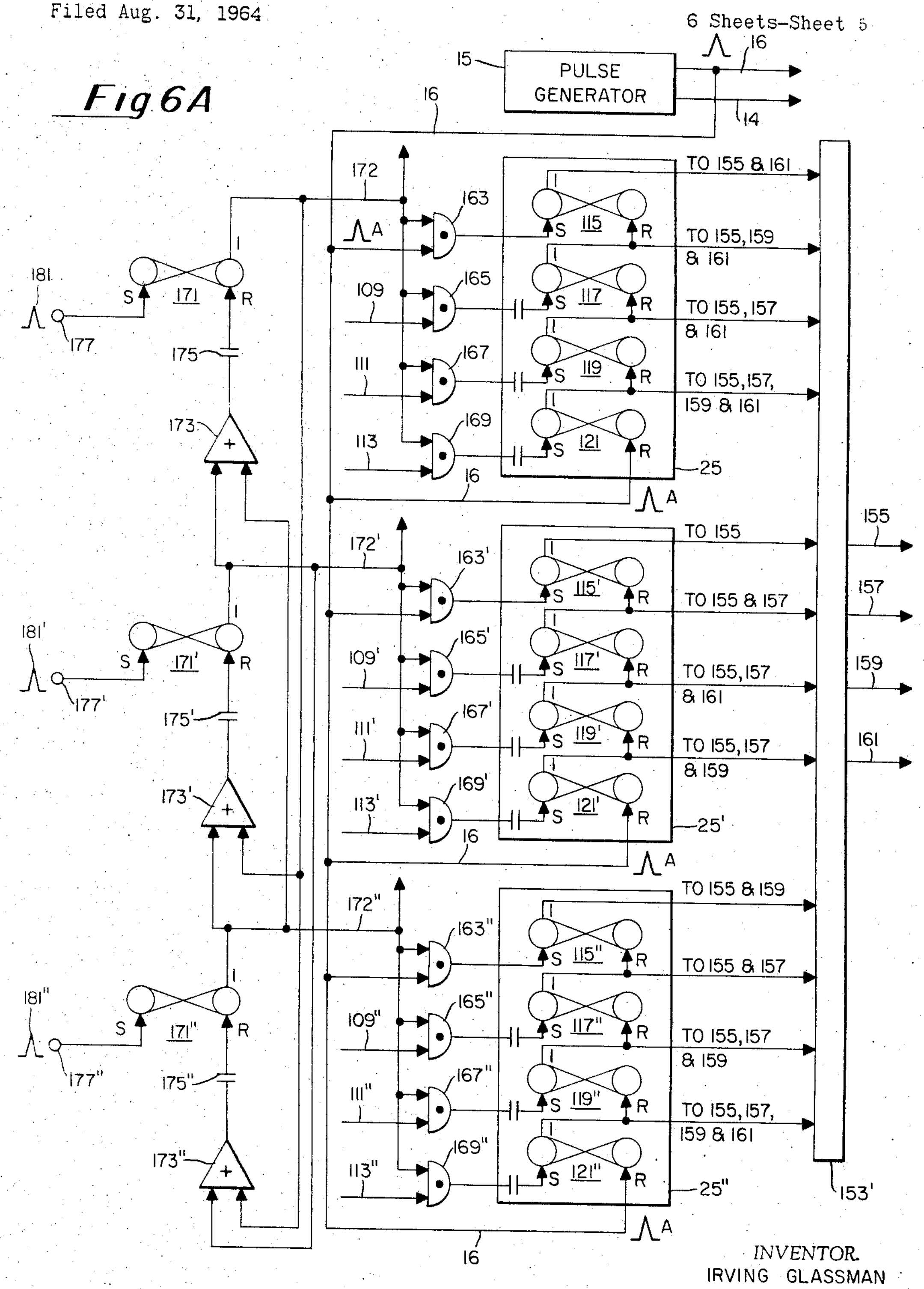
Figure 6B:
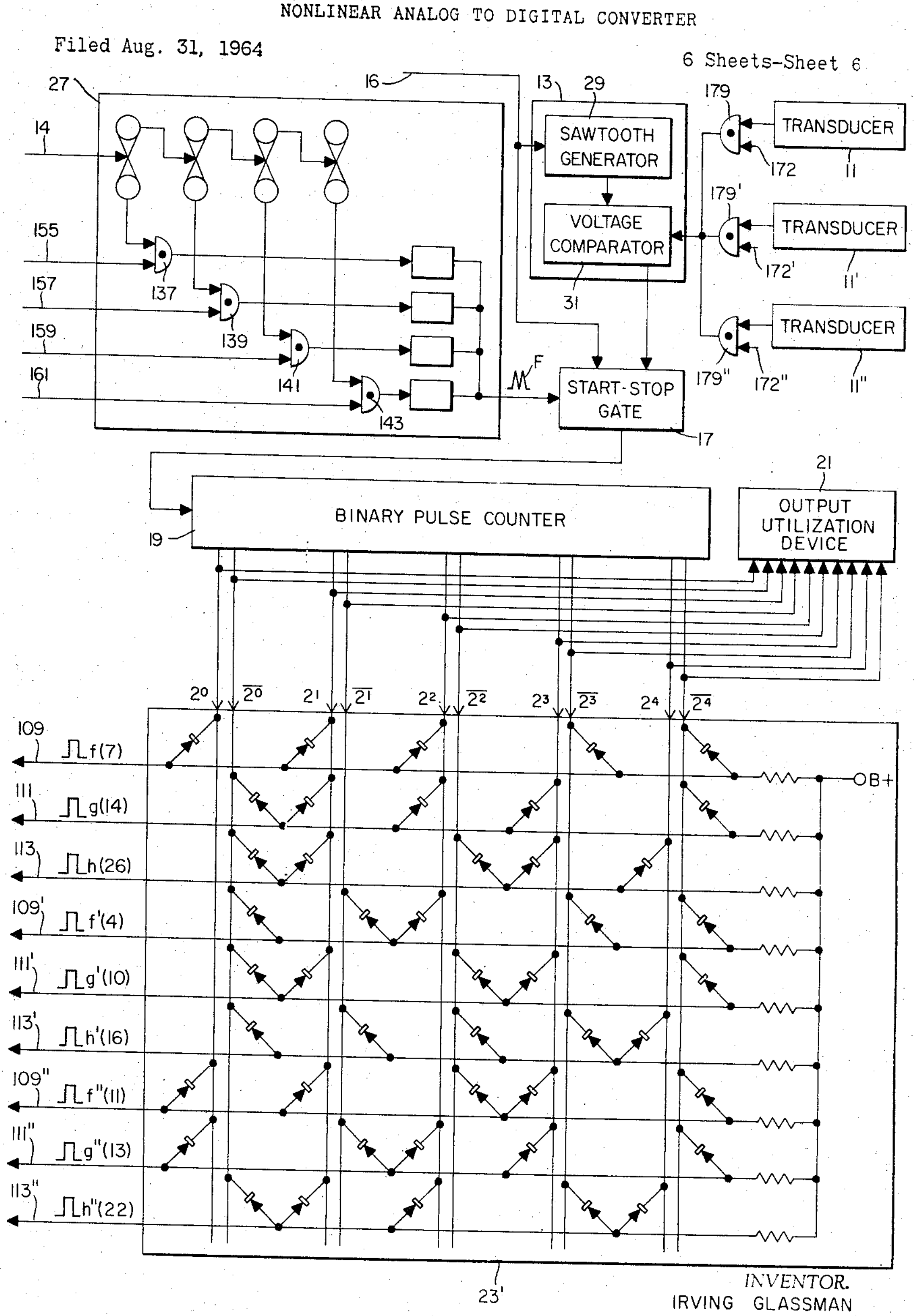

FIGS. 6A and 6B constitute a schematic diagram of a modification of the system shown in FIG. 4.

Figure 3:
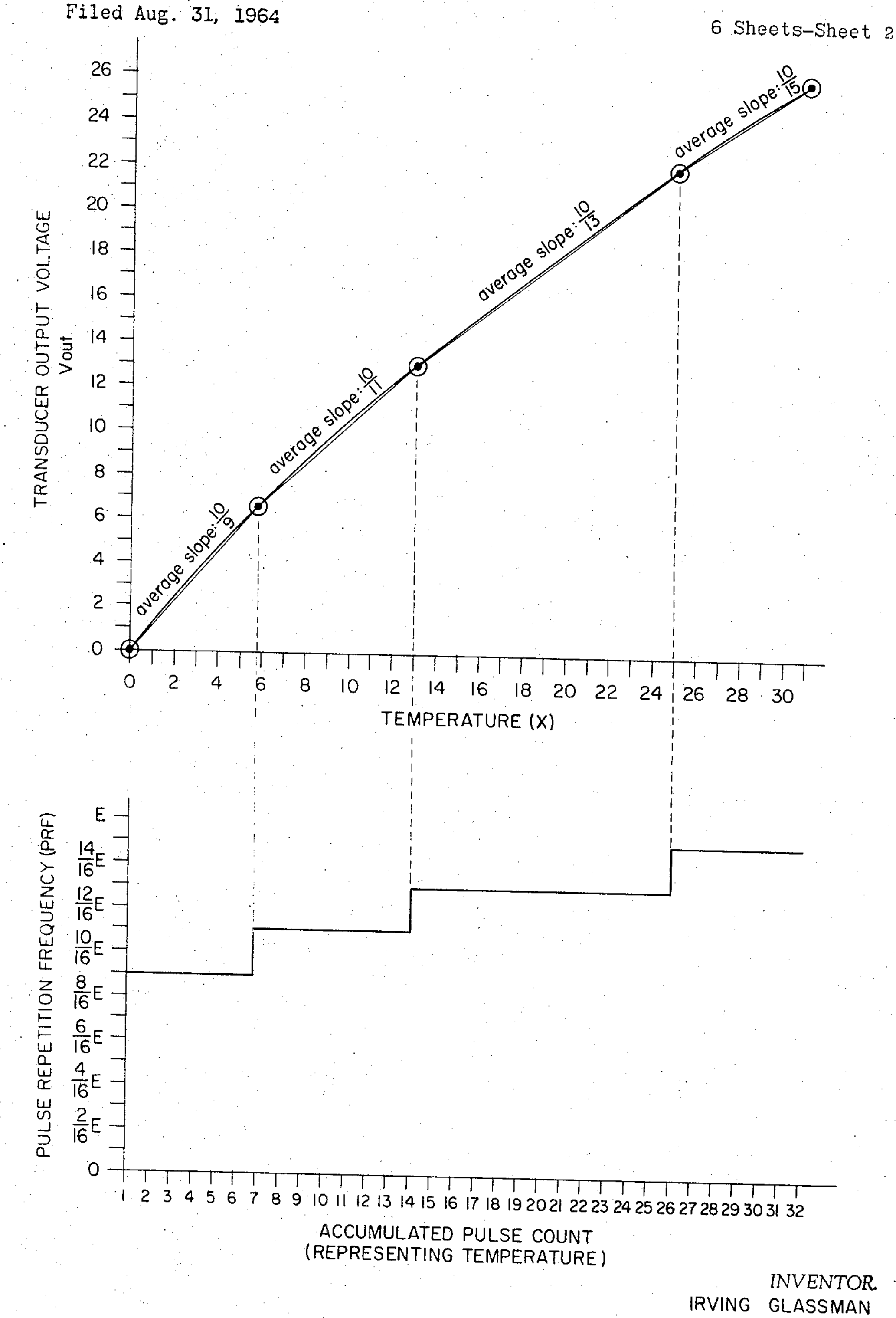
FIG. 3 is a graph showing the response curve of a transducer and the corresponding characteristics of the nonlinear portion of the system.

Referring to FIG. 3, there is shown an example of a voltage response curve of a nonlinear temperature to voltage transducer. The curve is not intended to represent any particular transducer but rather has been proportioned to best illustrate the principles of my invention. It is seen that the transducer output increases with a rise in temperature, and that the rate of this increase diminishes as the temperature increases.

Figure 1:
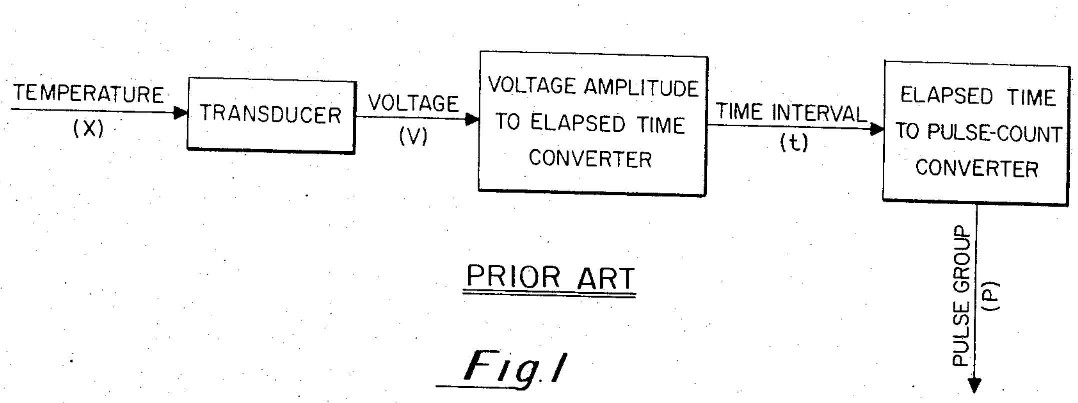
FIG. 1 is a block diagram of a prior art system.
Figure 2:
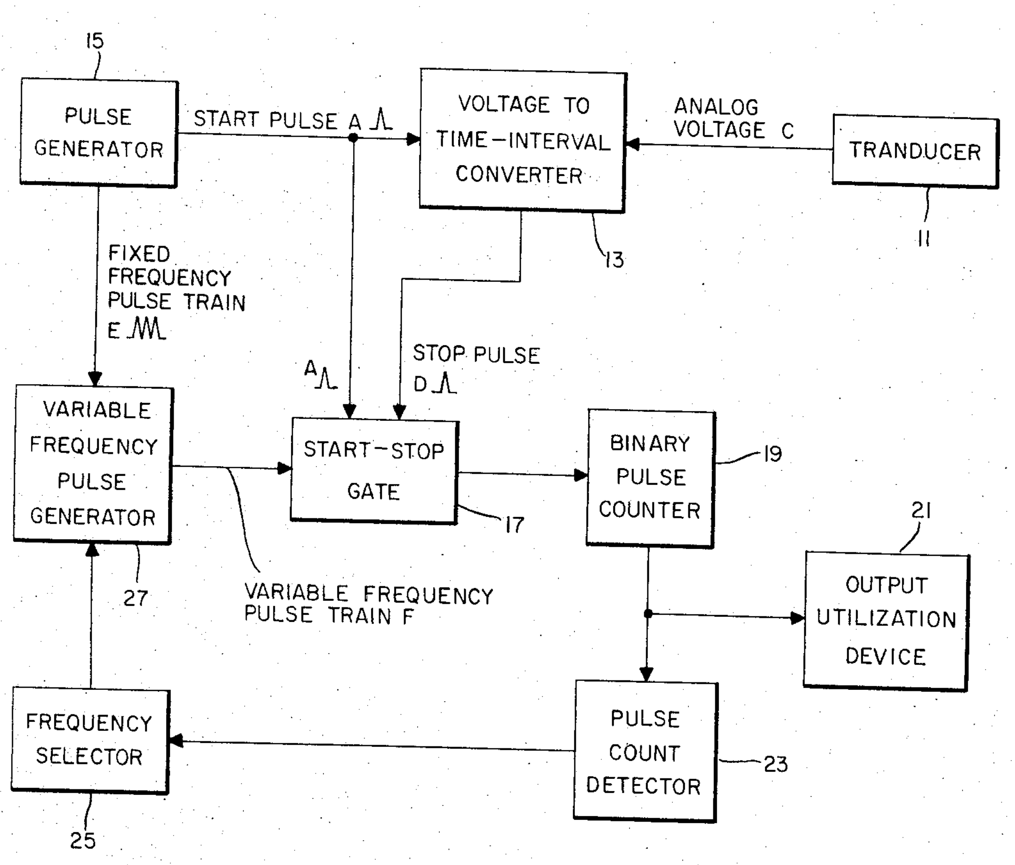
FIG. 2 is a block diagram of a system incorporating the present invention.

FIG. 2 is a block diagram of a system designed to compensate for such a nonlinearity. The output C of transducer 11 is continuously fed to the voltage to time-interval converter 13. When it is desired to sample the temperature, pulse generator 15 is caused to emit a start pulse A which is fed to converter 13 and also to start-stop gate 17. Shortly thereafter, the converter generates a stop pulse D which is also fed to the start-stop gate 17. The elapsed time between pulses A and D is a linear function of the output voltage of transducer 11.

A pulse train F is fed through the start-stop gate 17 from variable frequency pulse generator 27 to the binary pulse counter 19 during the interval elapsed between the generation of the start and the stop signals.

Pulse count detector 23 is programmed to sense the accumulation in the pulse counter 19 of several preselected numbers of pulses. After sensing each successive preselected number, the detector emits a control pulse which is fed to the frequency selector 25. With each successive control pulse, the frequency selector 25 alters the frequency of the variable frequency pulse generator 27.

The accumulated pulse count at which a pulse repetition frequency change is to be effected is chosen at suitable intervals along the transducer response curve; thus, in FIG. 3, the curve has been divided into four segments and the average slope of each segment has been determined. The pulse repetition frequency selected for each segment is chosen to be inversely proportional to the average slope of that segment, or a multiple thereof. Consequently, the product of $$\frac{\Delta V}{\Delta X} \times \frac{\Delta P}{\Delta t}$$

is kept substantially constant. With $\Delta t/\Delta V$ a constant, the pulse count produced will be a substantially linear function of the temperature sensed in the illustration.

Figure 5:
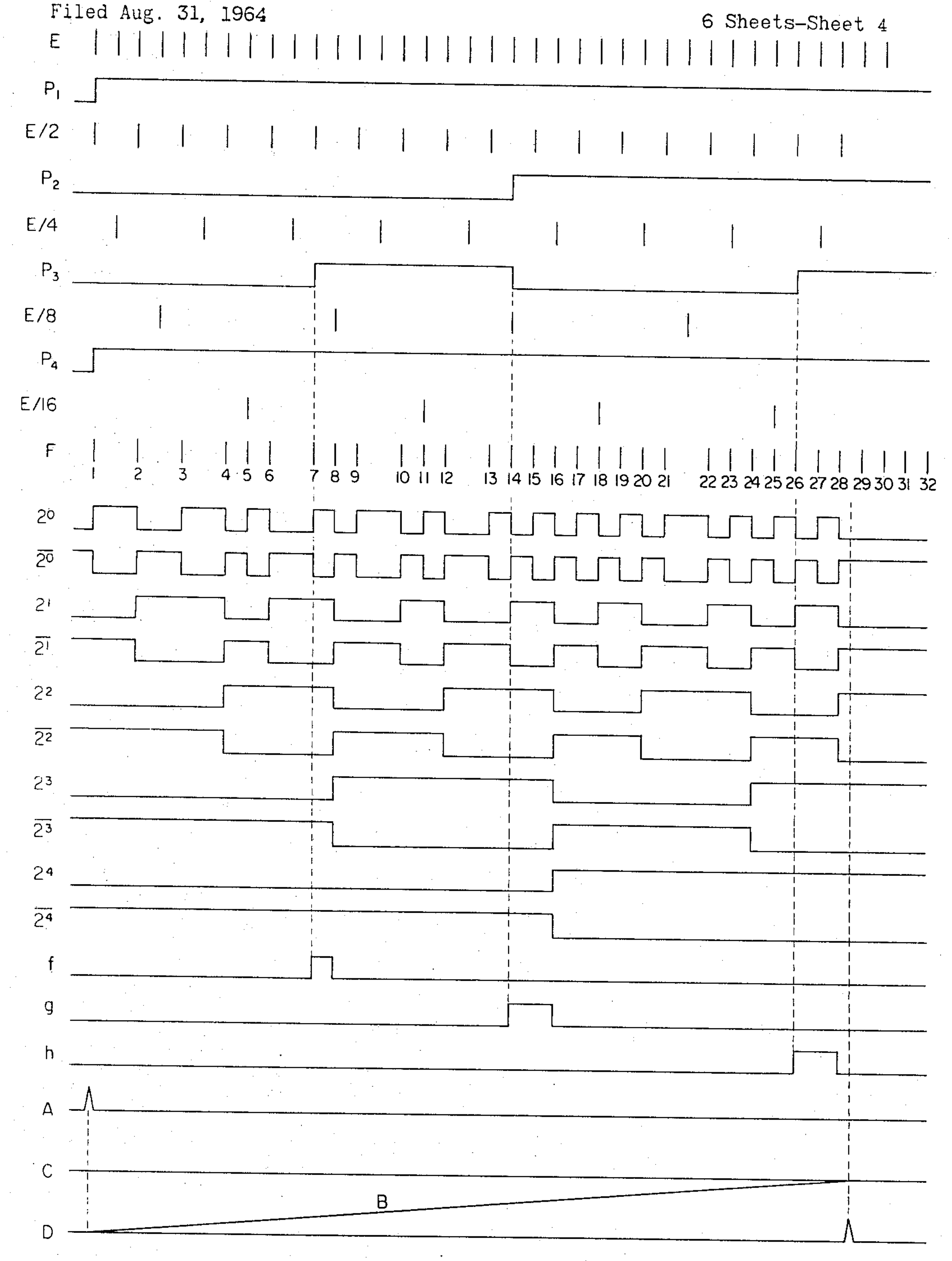
FIG. 5 is a timing diagram showing the time relationship of the output voltages of the various components of the system utilizing the present invention.

Referring now to FIGS. 4 and 5, the system will be described in more detail. First, each of the components of the system will be described individually and then the operation of the system, with all components cooperating, will be given.

*The transducer*

Transducer 11 is a device which produces a voltage C in response to a physical quantity monitored, such as temperature X. The relationship between voltage output and temperature may be such as that shown in FIG. 3. The response curve of the transducer is not linear and, for purposes of illustration, is divided into four segments. The average slopes of successive segments in the illustration are $$\frac{10}{9}, \frac{10}{11}, \frac{10}{13}, \text{ and } \frac{10}{15}$$

respectively.

*The voltage to time-interval converter*

Voltage to time-interval converter 13 comprises a sawtooth generator 29 and a voltage comparator 31. These devices are well known in the art and will not be described in detail here. A suitable converter which will perform the functions of voltage to time-interval converter 13 is described on pages 477–483 of vol. 19 of M.I.T. Radiation Laboratory Series, published in 1949 by McGraw-Hill Book Co., Inc. As there described, the sawtooth generator is a gated boot-strap circuit while the comparator is a single diode working into an output amplifier. The reference signal is applied to the cathode of the comparator diode. The sawtooth voltage is connected to the anode. Application of a gating pulse initiates a positive-going sawtooth waveform rising linearly from about one volt above ground. This waveform is shown as voltage B in FIGS. 4 and 5. A pulse D is produced at the plate of the output amplifier at the instant when the sawtooth voltage equals a reference voltage.

As shown in FIGS. 4 and 5, the sawtooth generator 29 produces a positive-going ramp voltage B which is initiated by pulse A received through line 16 from pulse generator 15. The ramp voltage B is fed to one input of voltage comparator 31. The output voltage C of transducer 11 is fed to the other input of comparator 31. Pulse D is produced at the output of comparator 31 at the instant when voltages B and C become equal.

*The pulse generator*

Pulse generator 15 may be any one of a number of well-known devices. It produces a trigger pulse A at the instant when it is desired to sample the temperature, or other quantity, which is being sensed by transducer 11. Additionally, preferably at a different output point, it produces a pulse train E.

*The start-stop gate*

Start-stop gate 17 comprises flip-flop 33 and AND gate 35. Flip-flop 33 may be of the type shown on page 144 of "Waveforms" of the M.I.T. Radiation Laboratory Series referred to above. It has a set and a reset input and at least one output at which a rise in voltage level is produced when the set input is triggered, and which persists until the reset input is triggered.

AND gate 35 is well known in the art. It has two inputs and a single output at which a voltage appears when both inputs are energized. The output of the flip-flop 33 is connected to one of the inputs of AND gate 35. The other input of AND gate 35 represents the input terminal of start-stop gate 17, while the output of AND gate 35 represents the output terminal of start-stop gate 17.

The start-stop gate is considered "open" when a voltage fed to its input terminal is transmitted through the AND gate 35 to appear at its output terminal. It is opened by application of a positive-going trigger pulse to the set input of flip-flop 33. The gate is closed by the application of a positive-going trigger pulse to the reset input of flip-flop 33. In FIG. 4 the set input of flip-flop 33 is connected through line 16 to the A output of pulse generator 15. The reset input of flip-flop 33 is connected to the output of voltage comparator 31.

The function of start-stop gate 17 is to confine the reception of pulses by binary pulse counter 19 to the period between start and stop pulses A and D. It will be clear to those skilled in the art that this may be equally well accomplished by eliminating start-stop gate 17, and incorporating circuitry in the pulse counter 19 whereby it is enabled and disabled by start and stop pulses A and D, respectively.

*The binary pulse counter*

Binary counter 19 may be of the type described on page 15 of "High-Speed Computing Devices" by Engineering Research Associates, published in 1950 by McGraw-Hill Book Co., Inc., New York and London.

In the simplified drawing of the counter which appears in FIG. 4 there are five cascaded, complementing flip-flops, 37, 39, 41, 43, and 45. The input terminal of flip-flop 37 constitutes the input to the binary counter 19 and is connected through line 18 to the output terminal of start-stop gate 17. Each flip-flop produces a voltage level rise at its "1" output each time it is triggered by an odd-numbered pulse in a train of pulses fed to its input. Additionally, each of the flip-flops produces a voltage rise at its "0" output each time it is triggered by an even-numbered pulse in a train of pulses fed to its input. This voltage rise is used to pulse through a capacitor the next succeeding flip-flop. The voltage level at the "0" output of a flip-flop complements the voltage level at the "1" output of that flip-flop; that is, when one output is "high" the other output is "low." Consequently, for any given flip-flop stage of the counter the "0" terminal will be referred to as the complement of the "1" output, with the symbol $\overline{2}^n$ being employed for this purpose, where $n$ is the order of the stage under discussion.

As seen in FIG. 5, each succeeding pulse in pulse train F, which is the input to counter 19, is represented by a unique combination of voltage levels at the "1" and "0" outputs of flip-flops 37, 39, 41, 43, and 45 which constitute the outputs of the binary counter 19. These outputs are designated $2^0$, $\overline{2^0}$, $2^1$, $\overline{2^1}$, $2^2$, $\overline{2^2}$, $2^3$, $\overline{2^3}$, $2^4$, and $\overline{2^4}$, respectively, and may serve as the output of the system for driving, through lines 20, an output utilization device 21.

The counter may be reset to register zero by application of a pulse to the reset inputs of its flip-flops 37 through 45. These reset inputs are all connected to pulse generator 15 through line 16.

*The pulse count detector*

Detector 23 is a diode decoding matrix, well known in the art. It comprises column conductors 47, 49, 51, 53, 55, 57, 59, 61, 63, and 65, each connected to a different input of the matrix, and row conductors 67, 69, and 71, each forming at one of its ends one output of the matrix. The other end of each of row conductors 67, 69, and 71 is individually connected through one of the voltage-dropping resistors 73, 75, and 77, respectively, to B+, a source of positive voltage. Each of diodes 79 through 107 is connected between one row conductor and one column conductor, poled for conduction from the former to the latter. A row conductor will be at an elevated voltage only when all column conductors to which it is connected through diodes are at an elevated voltage. Consequently, each row conductor may be preselected to undergo a voltage rise when a particular combination of column conductors is energized, by connecting it through diodes to those column conductors.

The interconnections of the row and column conductors of detector 23, as shown in FIG. 4, were chosen to make the system suitable for use with a transducer 11 having a response characteristic as shown in FIG. 3. Thus, row conductor 67 is connected through diodes 79, 81, 83, 85, and 87 to column conductors 47, 51, 55, 61, and 65, respectively; row conductor 69 is connected through diodes 89, 91, 93, 95, and 97 to column conductors 49, 51, 55, 59, and 65, respectively; and row conductor 71 is connected through diodes 99, 101, 103, 105, and 107 to column conductors 49, 51, 57, 59, and 63, respectively.

Column conductor 47 of detector 23 is connected to the $2^0$ output of pulse counter 19. Similarly, column conductors 49, 51, 53, 55, 57, 59, 61, 63, and 65 are individually connected to outputs $\overline{2^0}$, $2^1$, $\overline{2^1}$, $2^2$, $\overline{2^2}$, $2^3$, $\overline{2^3}$, $2^4$, and $\overline{2^4}$, respectively.

Inspection of FIG. 5 will show that beginning with the 7th and ending with the 8th pulse in the pulse train F, a voltage rise appears at outputs $2^0$, $2^1$, $2^2$, $\overline{2^3}$, and $\overline{2^4}$ of binary counter 19. Since each of the column conductors to which row conductor 67 is connected is itself connected to one of the named binary counter outputs, row conductor 67 will undergo a voltage rise during said interval. This is indicated in FIG. 4 by positive-going control pulse *f* appearing on line 109 connected to row conductor 67. Similarly, pulse *g* will appear between the 14th and 15th pulses of pulse train F on line 111 connected to row conductor 69. Finally, pulse *h* will appear between the 26th and 27th pulses in pulse train F on line 113 connected to row conductor 71 of detector 23.

*The frequency selector*

Frequency selector 25 comprises four flip-flops, 115, 117, 119, and 121. All of the flip-flops may be of the type used for flip-flop 33. The set input of flip-flop 115 is connected through line 16 to the A output of pulse generator 15. The set input of flip-flop 117 is connected through capacitor 123 to line 109. The set input of flip-flop 119 is connected through capacitor 125 to line 111. The set input of flip-flop 121 is connected through capacitor 127 to line 113. The reset input of flip-flop 121 is connected through line 16 to the A output of pulse generator 15.

*The variable frequency pulse generator*

Variable frequency pulse generator 27 is fully described in Patent No. 2,910,237, issued to M. A. Meyer et al. on Oct. 27, 1959, and will therefore not be described here in detail. It comprises a series of cascaded, complementing flip-flops 129, 131, 133, and 135. The "1" output of each flip-flop, that is, the output generated at the instant when the flip-flop is triggered, is used as a carry to trigger the next succeeding flip-flop in the cascade. The "0" output of each flip-flop, that is, the output generated when the second pulse and each succeeding even pulse is received by the flip-flop, serves as the output of that flip-flop. As explained in the aforementioned patent, the pulse repetition frequency of the output $$\frac{E}{2}$$

of the first stage, flip-flop 129, is one-half that of the pulse train E triggering its input. Similarly, the output $$\frac{E}{4}$$

of the next stage, flip-flop 131, has a pulse repetition frequency one-half that of the preceding stage, flip-flop 129, and each succeeding stage has half the pulse repetition frequency of the next preceding stage. Additionally, no two pulses in the four pulse trains $$\frac{E}{2}, \frac{E}{4}, \frac{E}{8}, \text{ or } \frac{E}{16}$$

coincide. Therefore, by selective mixing of the four pulse trains, a pulse train F having any one of 15 frequencies between $$\frac{E}{16} \text{ and } \frac{15}{16} E$$

may be obtained at the output of the variable frequency pulse generator 27.

Mixing of the pulse trains is accomplished by two-input coincidence gates (also called AND gates) 137, 139, 141, and 143. The "0" output of flip-flop 129 is connected to one of the inputs of gate 137 and, similarly, each of flip-flops 131, 133, and 135 has its "0" output connected to one of the inputs of gates 139, 141, and 143, respectively. The output of each of gates 137, 139, 141, and 143 is individually connected to the output terminal of variable frequency pulse generator 27 through buffers 145, 147, 149, and 151, respectively. Any of the pulse trains $$\frac{E}{2}, \frac{E}{4}, \frac{E}{8}, \text{ and } \frac{E}{16}$$

may be made to appear at the output of pulse generator 27 by enabling its associated AND gate with a pulse fed to its second or enabling input. In FIGS. 4 and 5, the voltages which enable gates 137, 139, 141, and 143 are denominated $P_1$, $P_2$, $P_3$, and $P_4$, respectively.

The "1" output of flip-flop 115 is connected through cable 153 to the enabling inputs of AND gates 137 and 143. The "1" output of flip-flop 117 is connected to the reset input of flip-flop 115 and also, through cable 153, to the enabling inputs of AND gates 137, 141, and 143. The "1" output of flip-flop 119 is connected to the reset input of flip-flop 117 and, through cable 153, to the enabling inputs of AND gates 137, 139, and 143. The "1" output of flip-flop 121 is connected to the reset input of flip-flop 119 and, through cable 153, to the enabling inputs of AND gates 137, 139, 141 and 143. The E output of pulse generator 15 is connected to the input of complementing flip-flop 129 of variable frequency pulse generator 27. Finally, the output of variable frequency pulse generator 27 is connected to the input of start-stop gate 17.

*Operation of the system*

At this point, it should be recalled that the system is designed to change its operating frequency periodically during a given sampling of a physical quantity, e.g., temperature.

At the instant when the illustrative temperature monitored by transducer 11 is to be sampled, pulse A is emitted by pulse generator 15. Additionally, either at the same time or before, pulse generator 15 also produces a pulse train E. Through lead 16, pulse A sets flip-flop 33, resets all stages of counter 19, resets flip-flop 121 of frequency selector 25, sets flip-flop 115 of frequency selector 25, and triggers sawtooth generator 29.

Sawtooth generator 29 generates a voltage B which increases linearly until it equals voltage C produced by transducer 11. Equality of voltages B and C marks the end of the sampling period.

Commencing with the generation of pulse train E, the cascaded flip-flops 129, 131, 133, and 135 of variable frequency pulse generator 27 produce pulse trains $$\frac{E}{2}, \frac{E}{4}, \frac{E}{8}, \text{ and } \frac{E}{16}$$

When trigger pulse A sets flip-flop 115, the output of that flip-flop enables gates 137 and 143. Consequently, commencing with the time of trigger pulse A, pulse train F is made up of pulse trains $$\frac{E}{2} \text{ and } \frac{E}{16}$$

making its pulse repetition frequency $$\frac{9}{16}E$$

Pulse train F is fed through the start-stop gate 17, opened by trigger pulse A, and through line 18 to the input of binary pulse counter 19. Upon occurrence of the 7th pulse, the $2^0$, $2^1$, $2^2$, and $\overline{2^3}$, and $\overline{2^4}$ outputs of the counter 19 are "high" and pulse *f* appears at line 109, as hereinbefore explained.

Pulse *f*, through capacitor 123, sets flip-flop 117. This causes a voltage rise to appear at the "1" output of flip-flop 117. This voltage rise resets flip-flop 115, discontinuing any enabling effect which that flip-flop had on AND gates of variable frequency pulse generator 27. Additionally, the voltage rise appearing at the "1" output of flip-flop 117 enables AND gates 137, 141, and 143. Consequently, beginning with the 7th pulse in the pulse train F, that pulse train is made up of pulse trains $$\frac{E}{2}, \frac{E}{8}, \text{ and } \frac{E}{16}$$

making its pulse repetition frequency $$\frac{11}{16}E$$

The pulse train F continues to be fed through the start-stop gate 17 and through line 18 to the binary counter 19. It should be remembered at this point that the ramp voltage output B of sawtooth generator 29 continues to increase toward the point where it equals the voltage C generated by transducer 11, and that the fact that pulse train F continues to be fed through the start-stop-gate 17 is an indication that the point of equality has not yet been reached.

Resuming now with the discussion of the pulse train F, when the 14th pulse in the pulse train is received by counter 19, its $\overline{2^0}$, $2^1$, $2^2$, $2^3$, and $\overline{2^4}$ outputs are "high" and a voltage pulse *g* appears on line 111 leading from pulse counter detector 23. Pulse *g* sets flip-flop 119. Flip-flop 119 resets flip-flop 117, causing its enabling effect to be discontinued. Flip-flop 119 also enables the AND gates 137, 139, and 143. Consequently, beginning with the 14th pulse, pulse train F is made up of the interspersed pulses of pulse trains $$\frac{E}{2}, \frac{E}{4}, \text{ and } \frac{E}{16}$$

Being made up of these three pulse trains, the pulse repetition frequency of pulse train F is now $$\frac{13}{16}E$$

Pulses in the pulse train F continue to be fed through start-stop gate 17 and through line 18 to the counter 19 at a frequency of $$\frac{13}{16}E$$

until 26 pulses have been received by the counter 19, at which time the $\overline{2^0}$, $2^1$, $\overline{2^2}$, $2^3$, and $2^4$ outputs of the counter are "high" and pulse *h* appears on line 113 leading from pulse detector 23. Pulse *h* sets flip-flop 121. Flip-flop 121 resets flip-flop 119. In addition to discontinuing the enabling effect of flip-flop 119, flip-flop 121 also enables AND gates 137, 139, 141, and 143.

Beginning, therefore, with the 26th pulse in the pulse train F, it is made up of pulse trains $$\frac{E}{2}, \frac{E}{4}, \frac{E}{8}, \text{ and } \frac{E}{16}$$

and has a pulse repetition frequency of $$\frac{15}{16}E$$

Pulses continue to be accumulated in the counter 19 at this rate until shortly after the 28th pulse, at which time voltages B and C become equal, in the illustrated case. When this occurs, voltage comparator 31 generates a voltage D which closes the start-top gate 17 and prevents any more pulses in the pulse train F from reaching the counter 19.

If the slope of the straight line segment approximation of the voltage response curve of transducer 11 is compared with the pulse repetition frequency of the pulse train F generated by frequency generator 27, it will be observed that at all times their product, $$\frac{\nabla V}{\Delta X} \times \frac{\Delta P}{\Delta t}$$

is a constant. Consequently the pulse count fed to and accumulated by the binary counter 19 and supplied by it through lines 20 to the output utilization device 21 approximates, for any given temperature X sensed by the transducer 11, a linear function of that temperature, as previously explained. In the event the utilization device 21 is not adapted to receive information in binary form, it may receive the output of the system from line 18.

The number of pulses emitted for the largest temperature which can be sensed by the transducer 11, as shown by the arrangement of FIG. 3, is limited to about thirty-two since the illustrated binary counter has only five stages. This has been done for the sake of simplicity. A more accurate compensation for transducer nonlinearities, resulting in a closer approximation of a linear relationship between the monitored temperature X and the pulse count fed to output utilization device 21, may be obtained by the use of a binary counter having a larger number of stages. In such a case, the response curve of the transducer 11 may be divided into many more segments than shown in FIG. 3. Such a device would, of necessity, have a larger matrix than that shown in FIG. 4. Similarly, the number of frequency selector flip-flops would also be increased, one being added for each additional curve segment.

A much greater flexibility in the frequency selected for the pulse train F may be obtained by increasing the number of flip-flops used in the variable frequency pulse generator 27 to more than the four illustrated for the sake of simplicity.

It will also be appreciated that the programming of variable frequency pulse generator 27 by frequency selector 25 need not always be such that the product $$\frac{\Delta V}{\Delta X} \times \frac{\Delta P}{\Delta t}$$

approximates a constant. The system may be equally well used to undercompensate or overcompensate for nonlinearities in the transducer, or to introduce nonlinearities to compensate for known nonlinearities of the utilization device rather than for those of the transducer.

*Multiple channel converter*

FIGS. 6A and 6B represent a modification of the system shown in FIG. 4 used for monitoring any one of several transducers, each having a different voltage response characteristic. The pulse generator 15, variable frequency pulse generator 27, the binary pulse counter 19, the voltage to time-interval converter 13, the start-stop gate 17, the output utilization device 21, and the transducer 11 are the same as those described in connection with FIG. 4. Transducers 11, 11′, and 11″, shown in FIG. 6B, are, respectively, connected through AND gates 179, 179′, and 179″ to the input of voltage comparator 31.

The pulse count detector 23′, shown in FIG. 6B, is an enlarged version of its counterpart in FIG. 4. It has nine row conductors instead of three. As in FIG. 4, row conductors 109, 111, and 113 are associated with transducer 11, and pulses *f*, *g*, and *h* appear on them with the occurrence of the 7th, 14th, and 26th pulses in the pulse train F fed to the binary pulse counter 19. Lines 109′, 111′, and 113′ are associated with the transducer 11′ and pulses *f′*, *g′*, and *h′* appear on them, respectively, upon occurrence of the 4th, 10th, and 16th pulses in the pulse train F. Finally, lines 109″, 111″, and 113″ are associated with the transducer 11″ and pulses *f″*, *g″*, and *h″*, respectively, appear on them at the occurrence of the 11th, 13th, and 22nd pulses in the pulse train F.

The transducers 11, 11′, and 11″ cooperate with frequency selectors 25, 25′, and 25″ of FIG. 6A, respectively. The frequency selector 25 has the same components and is connected to the inputs of the same combination of AND gates as its counterpart in FIG. 4. The second frequency selector, 25′ is similar to the first, also having four flip-flops, 115′, 117′, 119′, and 121′. The "1" output of flip-flop 115′ is connected through lines 155 of the cable 153′ to the enabling input of AND gate 137 of the variable frequency pulse generator. The "1" output of flip-flop 117′ is connected to the reset input of flip-flop 115′ and, through lines 155 and 157 of cable 153′ to the enabling inputs of AND gates 137 and 139. The "1" output of flip-flop 119′ is connected to the reset input of 117′ and, through lines 155, 157, and 161 of cable 153′, to the enabling inputs of gates 137, 139, and 143. Finally, the "1" output of flip-flop 121′ is connected to the reset input of 119′ and, through lines 155, 157, and 159 of the cable 153′, to the enabling inputs of gates 137, 139, and 141.

The third frequency selector, 25″, is similar to the first two and includes flip-flops 115″, 117″, 119″, and 121″. The "1" output of flip-flop 115″ is connected through lines 155 and 159 of cable 153′ to the enabling inputs of gates 137 and 141. The "1" output of flip-flop 117″ is connected to the reset input of flip-flop 115″ and, through lines 155 and 157 of cable 153′ to the enabling inputs of gates 137 and 139. The "1" output of flip-flop 119″ is connected to the reset input of flip-flop 117″ and, through lines 155, 157, and 159 of cable 153′, to the enabling inputs of gates 137, 139, and 141. The "1" output of flip-flop 121″ is connected to the reset input of flip-flop 119″ and, through lines 155, 157, 159, and 161 of cable 153′ to the enabling inputs of gates 137, 139, 141, and 143.

Each of the frequency selectors 25, 25′, and 25″ is controlled through a set of AND gates. The frequency selector 25 is controlled by AND gates 163, 165, 167, and 169 whose outputs are, respectively, connected to the set inputs of flip-flops 115, 117, 119, and 121, the last three connections being made through capacitors. Similarly, the outputs of AND gates 163′, 165′, 167′, and 169′ are, respectively, connected to the set inputs of flip-flops 115′, 117′, 119′, and 121′, again, the last three connections being made through capacitors. Finally, the outputs of AND gates 163″, 165″, 167″, and 169″ are, respectively, connected to the set inputs of flip-flops 115″, 117″, 119″, and 121″, again, the last three connections being made through capacitors.

Each of the above-mentioned AND gates has two inputs. One will be termed the "enabling" input and the other will be termed the "signal" input. The signal inputs of AND gates 163, 163′, and 163″ are all connected through line 16 to the A output of pulse generator 15. Line 16 is also connected to the reset inputs of flip-flops 121, 121′, and 121″. The signal inputs of AND gates 165, 167, and 169 are, respectively, connected to lines 109, 111, and 113 leading from the pulse count detector 23′. The signal inputs of AND gates 165′, 167′, and 169′ are respectively connected to lines 109′, 111′, and 113′ leading from the pulse count detector 23′. Finally, the signal inputs of AND gates 165″, 167″, and 169″ are respectively connected to lines 109″, 111″, and 113″ leading from the pulse count detector 23′.

The three groups of AND gates, which work into frequency selectors 25, 25′, and 25″, are themselves controlled by flip-flop 171, 171′, and 171″, respectively. The aforementioned flip-flops may be of the same type as that used for flip-flop 33 of the start-stop gate 17. The "1" output of the flip-flop 171 is connected through line 172 to the enabling inputs of AND gates 163, 165, 167, and 169. It is also connected through OR gate 173′ and capacitor 175′ to the reset input of flip-flop 171′ and, through OR gate 173″ and capacitor 175″, to the reset input of flip-flop 171″. Finally, through line 172 the "1" output of flip-flop 171 is also connected to the enabling input of AND gate 179 which appears between transducer 11 and the voltage comparator 31 in FIG. 6B.

The "1" output of the flip-flop 171′ is connected through line 172′ to the enabling inputs of AND gates 163′, 165′, 167′, and 169′. It is also connected through OR gate 173 and capacitor 175 to the reset input of flip-flop 171 and through OR gate 173″ and capacitor 175″ to the reset input of flip-flop 171″. Finally, again through line 172′ the "1" output of flip-flop 171′ is also connected to the enabling input of AND gate 179′ which appears between transducer 11′ and voltage comparator 31 in FIG. 6B.

The "1" output of flip-flop 171″ is connected through line 172″ to the enabling inputs of AND gates 163″, 165″, 167″, and 169″. It is also connected through OR gate 173 and capacitor 175 to the reset input of flip-flop 171 and through OR gate 173′ and capacitor 175′ to the reset input of flip-flop 171′. Finally, the one output of flip-flop 171″ is also connected through line 172″ to the enabling input of AND gate 179″ which appears between the transducer 11″ and voltage comparator 31. The set inputs of flip-flops 171, 171′, and 171″ are respectively connected to terminals 177, 177′, and 177″.

Operation of this modified device will be described by following through the monitoring of the outputs of the three transducers 11, 11′, and 11″.

Assume first that monitoring of the output of transducer 11 is desired. Flip-flop 171 is set by pulse 181 applied to terminal 177. The output of flip-flop 171 enables AND gates 163, 165, 167, 169, and 179. The output also resets flip-flop 171′ and 171″, causing all AND gates controlled by those flip-flops to be disabled. Operation in this mode is the same as that of the system described in connection with FIG. 4.

Monitoring of transducer 11, the output of which is fed to one input of voltage comparator 31 through enabled AND gate 179, commences with the generation of pulse A by the pulse generator 15. Pulse A is fed through line 16 and through enabled gate 163 to flip-flop 115, which it sets. Pulse A is also fed through line 16 to the reset input of flip-flop 121, to ensure that it is reset. Through lines 155 and 161, the set flip-flop 115 enables gates 137 and 143 of the variable frequency pulse generator 27 to make the initial pulse repetition frequency of the F pulse train $$\frac{9}{16}E$$

Upon occurrence of the 7th pulse in the F pulse train, a pulse $f$ is fed from pulse count detector 23' through line 109 and through enabled AND gate 165 to flip-flop 117, setting the latter. The set flip-flop 117 resets flip-flop 115 and enables, through lines 155, 159, and 161, the AND gates 137, 141, and 143 to make the pulse repetition frequency of the F pulse train $$\frac{11}{16}\text{E}$$

The 14th pulse in the F pulse train causes pulse $g$ to be fed through line 111 and through enabled AND gate 167 to flip-flop 119 which is set thereby. The flip-flop 119 resets flip-flop 117 and enables, through lines 155, 157, and 161, AND gates 137, 139, and 143 to make the pulse repetition frequency of the F pulse train $$\frac{13}{16}\text{E}$$

Finally, upon occurrence of the 26th pulse in the F pulse train, pulse $h$ is sent along line 113 and through the enabled AND gate 169 to set the flip-flop 121. Flip-flop 121 resets flip-flop 119 and, through lines 155, 157, 159, and 161, enables AND gates 137, 139, 141, and 143 to make the pulse repetition frequency of the F pulse train $$\frac{15}{16}\text{E}$$

If now, it is desired to monitor the output of transducer 11', flip-flop 171' is set by pulse 181' applied to terminal 177'. The output of flip-flop 171' enables AND gates 163', 165', 167', 169', and 179'. It also resets flip-flops 171 and 171'', causing the AND gates which are controlled by those flip-flops to be disabled.

As in the case of transducer 11, monitoring of the output of transducer 11', the output of which is now connected through enabled AND gate 179', one input of comparator 31, commences with the generation by pulse generator 15 of pulse A. Pulse A is fed through line 16 and through enabled gate 163' to flip-flop 115', setting the latter. Pulse A is also fed through line 16 to flip-flop 121', which it resets. The set flip-flop 115' enables, through line 155, gate 137 of the variable frequency pulse generator 27, making the initial pulse repetition frequency of the F pulse train $$\frac{8}{16}\text{E}$$

Upon occurrence of the 4th pulse in the pulse train F, pulse $f'$ is fed through line 109, and through enabled AND gate 165' to flip-flop 117' to set the latter. The set flip-flop 117' resets flip-flop 115' and enables, through lines 155 and 157, the AND gates 137 and 139, making the pulse repetition frequency of the F pulse train $$\frac{12}{16}\text{E}$$

The 10th pulse in the F pulse train causes pulse $g'$ to be fed through line 111' and through enabled AND gate 167' to flip-flop 119' which is set thereby. The set flip-flop 119' resets flip-flop 117' and, through lines 155, 157, and 161 enables AND gates 137, 139, and 143 to make the pulse repetition frequency of the F pulse train $$\frac{13}{16}\text{E}$$

Finally, upon occurrence of the 16th pulse in the pulse F, pulse $h'$ is sent along line 113' and through enabled AND gate 169' to set the flip-flop 121'. Flip-flop 121' resets flip-flop 119' and, through lines 155, 157, and 159, enables AND gates 137, 139, and 141, making the pulse repetition frequency of the F pulse train $$\frac{14}{16}\text{E}$$

Finally, if the output of transducer 11'' is to be monitored, flip-flop 171'' is set through terminal 177''. The "1" output of flip-flop 171'' enables the AND gates 163'', 165'', 167'', 169'', and 179''. It also resets flip-flops 171 and 171', causing the AND gates controlled by those flip-flops to be disabled. The output of transducer 11'' is now connected, through enabled gate 179'', to one input of comparator 31. Commencing with an A pulse from pulse generator 15, the pulse repetition frequency of pulse train F, generated by the variable frequency pulse generator 27, is controlled by flip-flops 115'', 117'', 119'', and 121'', in sequence.

Initially, flip-flop 115'' is set by pulse A through AND gate 163'' and by enabling AND gates 137 and 141 of the variable frequency pulse generator 27 causes the pulse repetition frequency of pulse train F to be $$\frac{10}{16}\text{E}$$

On occurrence of the 11th pulse of the pulse train F, pulse $f''$ is fed through line 109'' and through AND gate 165'' to the set input of flip-flop 117'', that flip-flop is set and enables AND gates 137 and 139 to cause the pulse repetition frequency of pulse train F to become $$\frac{12}{16}\text{E}$$

On occurrence of the 13th pulse of pulse train F, pulse $g''$ is fed through line 111'' and through AND gate 167'' to the set input of flip-flop 119''. The set flip-flop 119'' enables AND gates 137, 139, and 141 to cause the pulse repetition frequency of pulse train F to become $$\frac{14}{16}\text{E}$$

Finally, on occurrence of the 22nd pulse in the pulse train F, pulse $h''$ is fed through line 113'' and through AND gate 169'' to the set input of flip-flop 121''. The flip-flop 121'' is set, it in turn enables AND gates 137, 139, 141, and 143 and causes the pulse repetition frequency of pulse train F to become $$\frac{15}{16}\text{E}$$

Resetting of flip-flops 115'', 117'', 119'', and 121'' takes place in the same manner as that of their counterparts in frequency selectors 25 and 25'.

The functioning of sawtooth generator 29, voltage comparator 31, and start-stop gate 17 was not explained in the above description of the monitoring of transducer 11, 11', and 11''. In all three cases, these devices cooperate with the rest of the system in the same manner as described in connection with the system of FIG. 4. Briefly, to recapitulate, pulse A of pulse generator 15 opens start-stop gate 17 to enable pulse train F to be fed from variable pulse generator 27 to pulse counter 19. Pulse A also causes sawtooth generator 29 to produce a sawtooth voltage B which, after a time determined by the magnitude of voltage output C of the particular transducer being monitored, becomes equal to that voltage. Voltage pulse D is produced by voltage comparator 31 at the instant it senses equality of voltages B and C. Pulse D closes gate 17 and stops the flow of pulse train F to pulse counter 19.

It will have been noted in the above description of the monitoring of the three transducers, 11, 11', and 11'', that for each of them, the times during the generation of the pulse train F at which changes in its frequency are effected are different. It should also be noted that, for each of the transducers 11, 11', and 11'', the pulse repetition frequencies selected are different. Thus, there has been disclosed a digital to analog converter which may be time-shared several transducers having dissimilar nonlinear response characteristics and which can substantially compensate for the nonlinearities of each of those transducers.

The same remarks relating to possible modifications, which were made in connection with the basic system of FIG. 4, apply to the modified system of FIGS. 6 and 7. Additionally, the use of three channels, as illustrated in FIGS. 6A and 6B, need not be limiting. Any number of channels may be added to those herein illustrated. Also, the manner in which the different transducers are connected to the basic system is meant to be illustrative only. Many other ways will occur to those skilled in the art to selectively connect different transducers and those portions of the system which serve to effect compensation characteristic to each of them.

I claim:

1. In a voltage to pulse-count converter having a pulse train generator, a switch receiving pulses from the output of said generator, and means to close said switch for a time-interval proportional to the voltage to be converted, the improvement comprising:
means connected between said generator and said switch for modifying the frequency of the pulse train fed to said switch in response to the reception by said switch of each of several preselected numbers of pulses.

2. In a voltage to pulse-count converter having a pulse counter and means to enable said counter for a time determined by the magnitude of the voltage to be converted, the combination of:
a variable frequency pulse generator, the output of said generator being connected to the input of said counter; and
means responsive to the number of counts received by said counter for varying the frequency of said generator upon receipt of a preselected number of pulses by said counter.

3. In a voltage to pulse-count converter of the type having a pulse generator feeding pulses to a binary counter, and means to enable said counter to operate for a length of time which is a function of the magnitude of the voltage to be converted, the improvement comprising:
a pulse frequency modifying means connected between the output of said pulse generator and the input of said counter;
said means being responsive to each of several predetermined states of said counter to modify the frequency of the pulses fed to said counter upon the accumulation of each of several numbers of pulses in said counter.

4. A voltage to pulse-count converter comprising:
a switch;
means for closing said switch for a time determined by the magnitude of the voltage to be converted;
a register for counting pulses and having a set of output terminals energized in a unique combination for each pulse received by said register;
means for generating pulses at several selectable repetition rates connected through said switch to the input of said register; and
control means connected between the outputs of said register and said pulse generating means for changing the pulse repetition frequency of said pulse generating means in response to each of several preselected patterns of energization of said register outputs.

5. A device for converting the voltage output of a nonlinear transducer into a pulse group whose number is a substantially linear function of a physical quantity being sensed by said transducer, comprising:
a pulse counter;
means to enable said pulse counter for a period of time which is a function of the voltage produced by said transducer;
means for generating and feeding to said counter a pulse train; and
means connected between said pulse counter and said pulse generator for changing the frequency of the pulse train produced by said pulse generator in response to the accumulation of each of several preselected numbers of pulsers in said pulse counter, each said change substantially compensating for a change in the response characteristic of said nonlinear transducer.

6. A device for converting the voltage output of a transducer having a nonlinear response characteristic into pulses substantially proportional in number to a physical quantity being sensed by said transducer, comprising:
a first binary counter enabled for a period of time proportional to the voltage produced by said transducer;
a pulse train generating means;
a second binary counter having a plurality of cascaded complementary flip-flops, the input of the first flip-flop of said plurality being electrically connected to the output of said pulse train generating means;
a plurality of coincidence gates having first and second inputs and an output, the first input of each of said gates being connected to an output of a different one of said flip-flops;
means connecting the outputs of all said gates to the input of said first binary counter;
means for energizing the second inputs of preselected combinations of said coincidence gates, responsive to each of several preselected successive numbers of pulses received by said first binary counter.

7. A device for converting the voltage output of a transducer having a nonlinear response characteristic into pulses subtantially proportional in number to a physical quantity being sensed by said transducer, comprising:
a first gate having an input and an output;
means connected to said gate for enabling conduction of said gate from said input to said output during a period of time proportional to the voltage produced by said transducer;
a pulse train generating means;
a binary counter having a plurality of cascaded complementary flip-flops, the input of the first flip-flop of said plurality being connected to the output of said pulse train generating means;
a plurality of coincidence gates, each having first and second inputs and an output, the first input of each of said gates being coupled to an output of a different one of said flip-flops;
means connecting the outputs of all said coincidence gates to the input of said first gate;
control means, connected between the output of said first gate and the second inputs of said coincidence gates, for enabling a preselected combination of said coincidence gates in response to each group of several predetermined groups of pulses passed by said first gate.

8. The device of claim 7 wherein said control means includes a second binary counter of cascaded flip-flop stages, each said stage having an output means; and
a decoding matrix connected to the outputs of said flip-flop stages and producing a control pulse in response to registration in said second counter of each group of said predetermined groups of pulses.

9. The device of claim 8 wherein said control means additionally includes a plurality of flip-flops each triggered by one of said control pulses and each having an output connected to a different combination of said coincidence gates.

10. The device of claim 7 wherein said means for enabling said first gate includes a sawtooth voltage generator and a voltage comparator having an input connected to the output of said voltage generator and another input connected to the output of said transducer.

11. A system for converting the voltage output of any one of a plurality of nonlinear transducers into a pulse group which is a substantially linear function of a physical quantity being sensed by said transducer, comprising:
linear means for converting the voltage of a selected one of said nonlinear transducers into a time interval;

means for generating a pulse train at a plurality of selectable frequencies;

means for gating said pulse train during said time interval;

multiprogrammed means for selecting said frequencies of said pulse train generating means, said multiprogrammed means having a program individual to each of said transducers; and binary control means for said multiprogrammed means having a single input from said gating means and a plurality of sets of outputs, said number of sets being equal to the number of said transducers, said control means commanding a change in frequency by said multiprogrammed means at preselected numbers of pulses in said pulse train.

12. The combination of claim 11 wherein said multiprogrammed means also controls the exclusion of all said transducers except said selected one.

13. In an analog to digital converter wherein a gate is closed for a period of time determined by the analog signal received by said converter, said gate having an input circuit and also having an output circuit responsive to energization of said input circuit when said gate is closed, a system for generating a number of pulses which is a selectable function of said analog signal, comprising:

a variable frequency pulse generator having a set of control inputs and also having an output connected to the input of said gate, said pulse generator producing at its output a pulse train at a different frequency for each pattern of energization of said control inputs;

a binary pulse counter having an input connected to the output of said gate and having a plurality of output circuits;

a decoding matrix having a first plurality of lines and also having a second plurality of lines connected to said output circuits, and coupled in a code pattern to said first plurality of lines to energize preselected ones of said first plurality of lines in response to a predetermined state of said counter;

a plurality of sets of control means, each said control means having an actuating input means and also having an output means connected to energize, when said control means is actuated, a predetermined combination of the control inputs of said variable frequency pulse generator;

a plurality of gating means, each associated with a different set of said control means to conditionally connect the input means of each control means in said set to at least one of said first plurality of matrix lines;

and means for selectively enabling any one of said gating means.

References Cited

UNITED STATES PATENTS 3,281,828 10/1966 Kaneko ------------ 340—347

DARYL W. COOK, *Acting Primary Examiner.*

J. H. WALLACE, *Assistant Examiner.*